Oct. 22, 1963     L. E. MATTHEWS     3,107,549
CONTINUOUSLY ADJUSTABLE ECCENTRIC CRANK
Filed Dec. 17, 1958     3 Sheets-Sheet 1

INVENTOR.
LYLE E. MATTHEWS
BY
ATTORNEYS

Oct. 22, 1963 L. E. MATTHEWS 3,107,549
CONTINUOUSLY ADJUSTABLE ECCENTRIC CRANK
Filed Dec. 17, 1958 3 Sheets-Sheet 2

INVENTOR.
LYLE E. MATTHEWS
BY
ATTORNEYS

Oct. 22, 1963　　L. E. MATTHEWS　　3,107,549
CONTINUOUSLY ADJUSTABLE ECCENTRIC CRANK
Filed Dec. 17, 1958　　3 Sheets-Sheet 3

INVENTOR.
LYLE E. MATTHEWS
BY F. J. Schmitt
George J. Rubens
ATTORNEYS

United States Patent Office 3,107,549
Patented Oct. 22, 1963

3,107,549
CONTINUOUSLY ADJUSTABLE ECCENTRIC CRANK
Lyle E. Matthews, 3412 Minna St., Oxnard, Calif.
Filed Dec. 17, 1958, Ser. No. 781,172
6 Claims. (Cl. 74—571)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus by means of which a particular vibratory environment may be simulated in order to determine the performance of one or more components designed to operate in such an environment for an extended period of time. The invention further relates to a driving mechanism, especially but not exclusively intended for use with such a vibration simulator, which acts to convert rotary motion into reciprocating or oscillatory movement, and which incorporates an eccentric the degree of eccentricity of which may be controllably varied while the mechanism is in operation.

It is frequently desirable to ascertain in advance the reliability of a component or assembly which will be subjected in actual use to severe and/or prolonged shock or vibrations. To accomplish this with any degree of accuracy, the apparatus employed for testing purposes must be able to simulate quite closely the actual conditions to be encountered by the structure under investigation.

When the latter is of relatively small size and weight, the problem is not too difficult of solution. However, especially as the weight factor increases, conventional testing machines yield results which are progressively less satisfactory. For example, practically all equipment designed for shipboard use must withstand substantially continuous vibration (caused primarily by the ship's propellers) while the vessel is under way. Such vibration is usually of a fairly constant frequency between 15 and 20 cycles per second, with an amplitude up to one g depending upon the cruising speed of the ship and the location thereon. Ordinarily, this is not too serious a matter, as most marine installations are of a rather massive nature. However, at the present time various types of guided missiles are being mounted on aircraft carriers or other vessels specifically designed to accommodate such weapons, and, of course, the missiles, as well as their associated check-out equipment, must be ready for instant use. These missiles, especially in their guidance systems, incorporate a large number of extremely minute parts which are delicately balanced and critically positioned. Although of course these components are designed to be as rugged as possible, space limitations necessitate certain compromises in this respect, and, in order to determine just what the limit is to which a missile can be continuously vibrated before operational failure ensues, preinstallation laboratory tests are a practical necessity.

In the example above given, a single missile and its associated check-out apparatus may weigh in the neighborhood of 4,000 pounds and extend over a base area of as much as 100 square feet. A platform of suitable size and strength to support such a load may weigh 2,000 pounds. Since a satisfactory laboratory vibrator should be capable of producing an acceleration of at least 2 g's, the required vibratory force for the missile assembly plus its platform is at least 12,000 pounds, or 6 tons. In addition, some 2,000 pounds of this load may be on shock mounts, so that, at resonance, its acceleration is amplified by a factor of three. This requires an additional two tons of force to vibrate the platform. Thus, the testing device must be capable of developing from eight to ten tons of vibratory force. The situation is made even more complex by the fact that the load is spread over a large surface area (the platform may be 10′ x 10′, for example) and, in addition, the center of gravity of the load is frequently offset from the center of the platform. Still further, a lateral stability problem may arise if the load's center of gravity is more than a few inches above the platform surface.

For optimum results, the vibrator should produce simple harmonic motion in the vertical direction with minimum angular movement about any axis. It should also operate equally well under all load conditions within its rated capabilities. Finally, it should possess a minimum number of adjustments for frequency, amplitude and balance, with such adjustments being readily accessible to the operator thereof.

A vibrator which satisfies the above requirements is provided by the present invention. In a preferred embodiment, it consists of a flat table or platform which is horizontally supported in spaced relation to a rigid foundation through a plurality of toggle joints. Each toggle joint has two arms, one of which is pivotally secured at one of its ends to the table, and the other of which is pivotally secured at one of its ends to the foundation. The remaining ends of the arms are rotatably attached to one another and to a connecting rod which extends horizontally in the space between the foundation and the lower surface of the platform. An oscillatory movement of this connecting rod results in a vertical displacement of the platform, first downwardly and then upwardly. Three or four toggle joints are usually associated with each connecting rod, and a number of such connecting rod assemblies arranged in parallel fashion so as to provide adequate support for all sections of the platform.

The present invention also provides a particular driving mechanism for imparting oscillatory movement to each connecting rod used with the vibrator described above. This driving mechanism consists of an eccentric by means of which rotation of a power shaft may be converted into oscillatory form, this eccentric being so designed that the amplitude of the oscillatory movement produced thereby may be manually varied while the apparatus is in operation.

While an eccentric of this nature is especially useful in conjunction with a vibration simulator, it also finds application as a driving mechanism for a variable-compression-ration engine or a fuel injector. Instead of employing a constant stroke and controlling the amount of fuel fed to the engine by producing relative angular displacement between a spirally slotted piston and its cylinder to thereby relieve the fuel pressure at different points in the compression cycle, the eccentric of the present invention achieves the same result by varying the stroke. This eliminates the necessity of producing relative rotation between the piston and cylinder and thus simplifies the engine mechanism to a considerable degree.

One object of the present invention, therefore, is to provide test apparatus for the laboratory simulation of a particular vibratory environment.

Another object of the invention is to provide a so-called "vibration table" adapted to produce vertical vibratory motion from a driving force applied in a direction generally transverse thereto.

A further object of the invention is to provide a mechanism for converting rotary motion into oscillatory or reciprocating movement, the amplitude of the latter being adjustable while the apparatus is in operation.

A still further object of the invention is to provide an eccentric designed for mounting on a rotatable drive shaft, the eccentric having means through which its degree of "throw" may be manually adjusted without interfering with or interrupting normal rotation of the drive shaft.

Other objects and many of the attendant advantages of this invention will be readily appreciated as the same becomes better understood by reference to the following detailed description when considered in connection with the accompanying drawings wherein.

Figure 1:
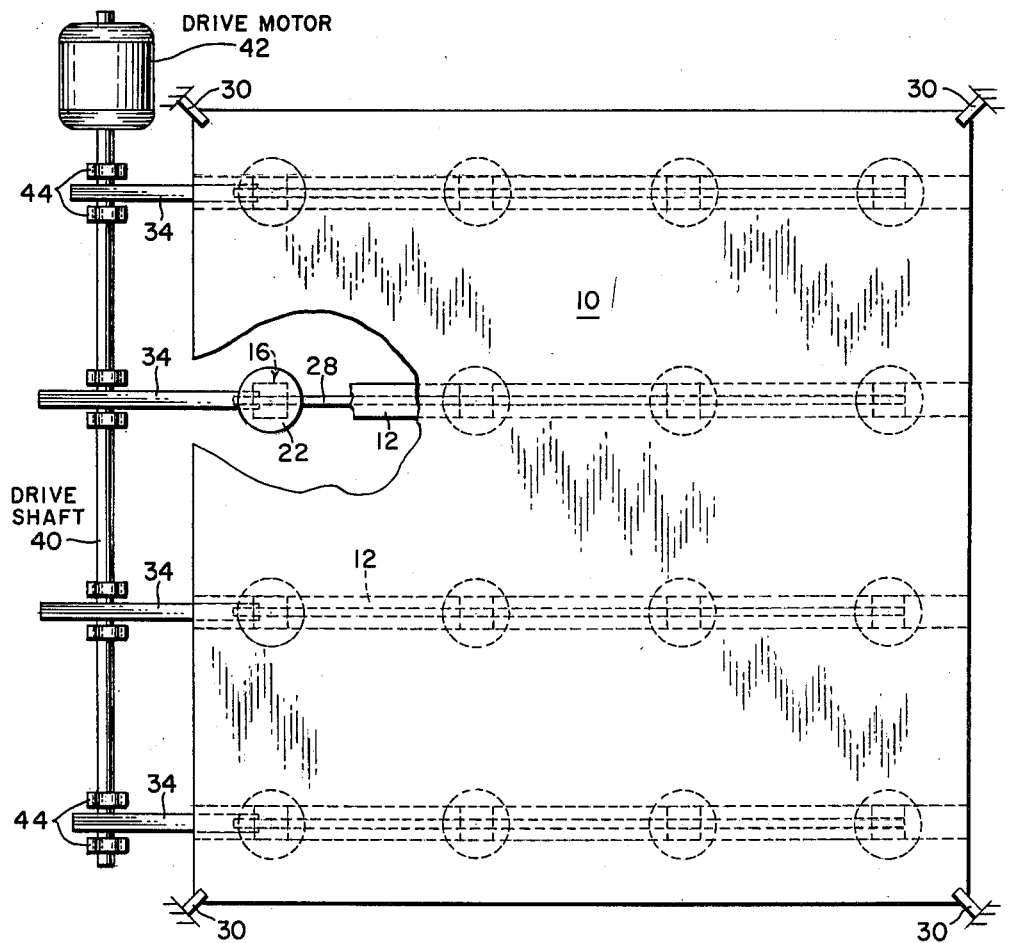
FIG. 1 is a plan view of a vibration simulator designed in accordance with a preferred embodiment of the present invention.

A number of techniques are presently known by means of which a load may be vibrated. One of these employs the principle of resonance, and is embodied, for example, in a platform mounted on springs and driven by an oscillatory force. When the stiffness of the springs is such that the natural frequency of the spring-load system is the same as that of the driving frequency (or in other words, when the system is at resonance) then the springs produce most of the vibratory force and very little external power is required. A disadvantage is that large forces are applied to the support on which the springs are mounted. Another method utilizes the reaction thrust generated by the rotation of unbalanced weights. This has the advantage over the resonant shaker of imparting greatly decreased forces to the base or support on which the shaker is mounted.

Each of the above systems, however, has certain drawbacks. These includes (1) a relatively high degree of instability, especially when the weight distribution is non-uniform, (2) the mode of vibration varies when the load is at resonance, and (3) actual vibratory displacement is a function of load, load distribution, and frequency.

To overcome the drawbacks of structures such as the above, the present invention provides for the development of linear vibratory motion from oscillatory motion occurring in a plane normal to the vibrations. This is accomplished in the embodiment illustrated by means which includes the table or platform 10 of FIGS. 1 and 2. This table 10 may be fabricated of some material such as one-inch thick aluminum alloy, and is of a size (10' x 10' is typical) dependent upon the particular dimensions of the package to be tested. Although not shown, a plurality of openings are formed in the table to accommodate a corresponding number of hold-down bolts, the location of such openings being again governed by the physical characteristics of the object or assembly under investigation. Attached to the lower surface of table 10 to lend structural rigidity thereto are a plurality of I-beams 12 also preferably formed of aluminum alloy and arranged in spaced-apart parallel fashion as shown in the drawings.

The table assembly 10—12 is designed to be supported upon a solid base 14 (such as a concrete foundation) in such fashion that it may undergo limited vertical displacement with respect thereto. For this purpose, there is provided a plurality of double toggle joints each of which is generally identified in the drawings by the reference numeral 16. Although the number of such toggle joint assemblies is obviously determined by the surface dimensions of table 10, the drawing illustrates four rows of toggles parallel to and aligned with the I-beams 12, with four toggles in each row. To eliminate or substantially reduce unloaded "beam" resonance in the first and second natural modes, each toggle joint assembly is located near the natural mode nodal lines of the platform. The natural frequency of the third mode is beyond the operating limits of the illustrated device.

Figure 2:
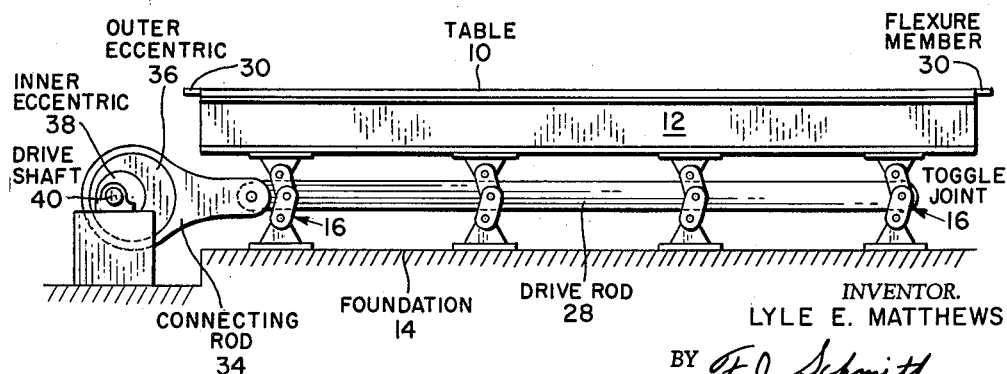
FIG. 2 is an end view of the vibration simulator of FIG. 1 showing certain of the toggle joint assemblies.
Figure 2A:
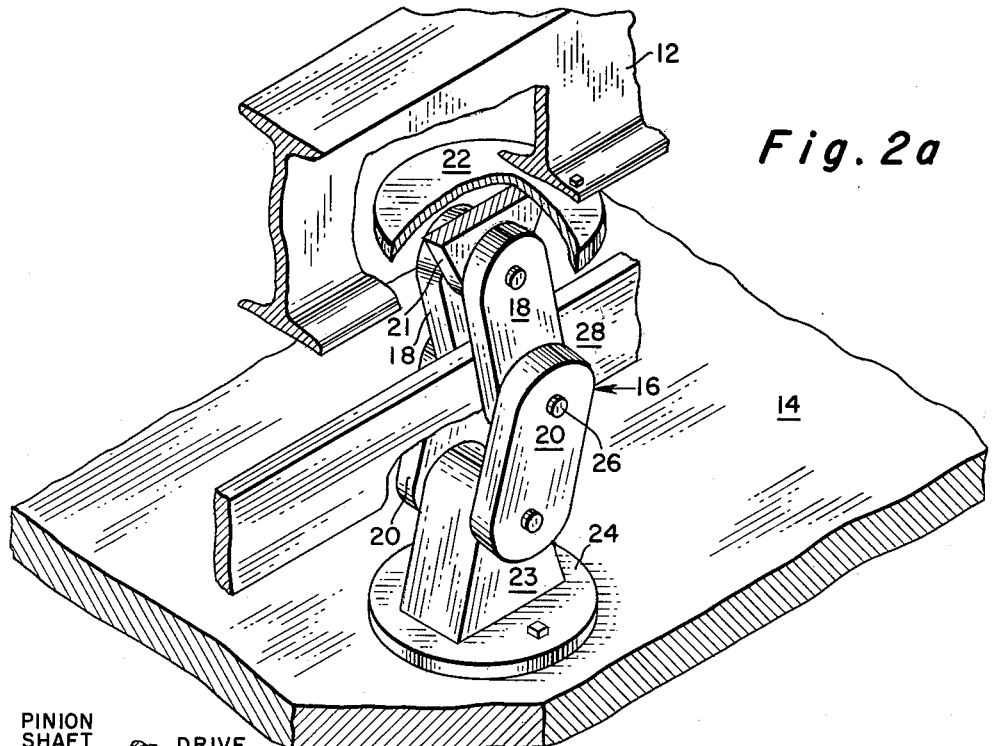
FIG. 2a is an enlarged view of one of the toggle joint assemblies of FIG. 2.

A representative toggle joint assembly is shown in FIG. 2a. It consists of a pair of double toggle arms 18 and 20, the arm 18 being pivotally attached at its upper end to the support block 21. The latter is secured to the under surface of the I-beam 12 through the disc-shaped adaptor 22, while the arm 20 is pivotally secured at its lower end to the base or foundation 14 by means of the pillow block 23 and the adaptor 24. The remaining extremities of the toggle arms 18 and 20 are pivotally connected by the pin 26 to form a "knee" joint, as illustrated.

Referring again to FIG. 2, the "knee" joints of the toggles making up a single row are actuated by a common transverse drive rod 28 which, for example, may be a horizontally-positioned bar of aluminum alloy having openings designed to receive the pins 26.

It should now be apparent that movement of the drive rod 28 essentially in a horizontal plane (alternately from left to right in FIG. 2) will result in a vertical displacement of the table 10. This displacement should contain no appreciable horizontal component, and, consequently, four flexure members 30 are respectively attached to the corners of table 10 (as shown in FIGS. 1 and 2 only) to reduce any horizontal motion of the table to a minimum. It is desirable to reverse the direction of motion of the toggle knee joints in alternate rows to effectively cancel any horizontal thrust forces which might otherwise be developed during operation.

Each transverse drive rod 28 has essentially simple harmonic motion imparted thereto by means of a connecting rod 34 (FIGS. 1 and 2) one end of which is pivotally connected to the drive rod 28 and the other end of which is mounted through ball bearings on an eccentric 36, the latter in turn being rotatably carried on a second eccentric 38. Although the operation of the dual eccentric unit 36—38 will be set forth hereinafter, especially in connection with a description of FIGS. 3 and 4 of the drawings, it might be mentioned at this time that the inner eccentric 38 is mounted on a drive shaft 40 for rotation therewith. The outer eccentric 36 is adjustable in position with respect to the inner eccentric 38, and, as a result of such an adjustment, the lateral movement imparted to the member 28 (or, in other words, the "throw" of the connecting rod 34) may be controllably varied from zero to maximum to correspondingly vary the vertical displacement of the platform or table 10. In FIG. 2 the two eccentrics 36—38 are set for a maximum "throw" of the connecting rod 34.

It will be noted that the essentially simple harmonic motion imparted to the drive rod 28 produces a sinusoidal movement of the platform 10 at twice the oscillatory frequency of the drive rod. This "frequency-doubling" factor enables the drive shaft 40 to operate at a relatively low speed of rotation. For example, a drive shaft speed of 600 r.p.m. develops a vibratory platform movement at the rate of 20 c.p.s.

The shaft 40 is driven by a variable speed motor 42 (FIG. 1). It is supported by a plurality of roller bearing pillow blocks 44 one of which is placed on each side of each connecting rod assembly.

It might be expected that an off-center relationship of the two eccentrics 36—38 as described above might result in a dynamic unbalance of the crankshaft mechanism. Any such tendency, however, is readily overcome by adding weights thereto. Specifically, the center of gravity of the outer eccentric (plus its bearing) and that part of the connecting rod assembly directly associated therewith is adjusted to the center of the inner eccentric. Then weights are added to the inner eccentric until the combined center of gravity of all of the rotating parts is adjusted to the axis of the drive shaft. Such a technique provides dynamic balance of assembly regardless of the particular eccentricity setting selected.

Figure 3:
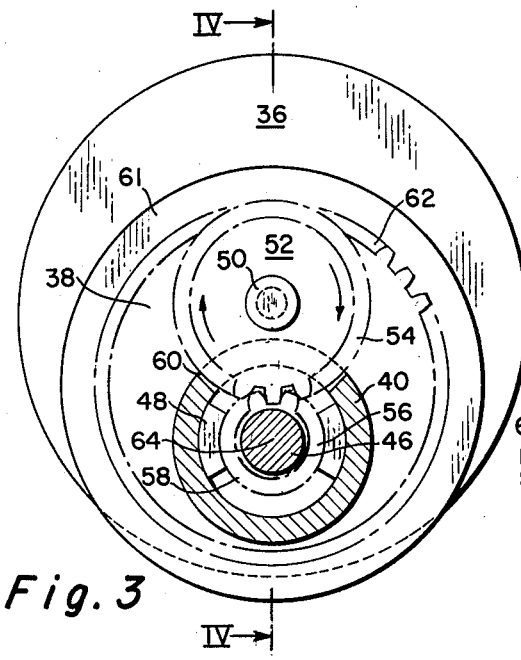
FIG. 3 is a view, partly in section, of an adjustable eccentric such as may be used in the vibration simulator of FIG. 1.
Figure 4:
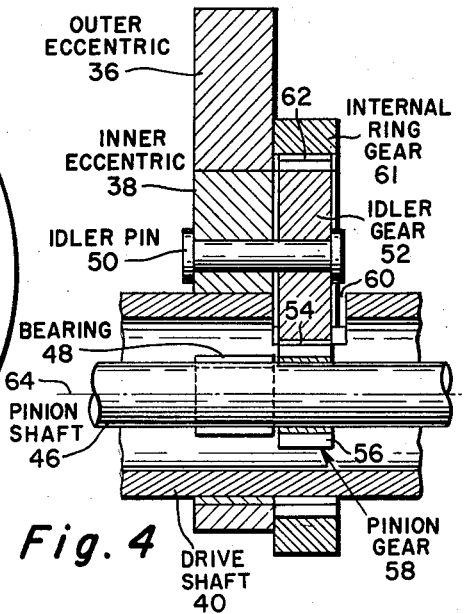
FIG. 4 is a sectional view of FIG. 3 taken along the line IV—IV.

FIGS. 3 and 4 illustrate in greater detail the constructional features of the power transmission assembly 34, 36, and 38 of FIG. 2. It will be noted that the inner eccentric 38 is shown as a separate component secured to the drive shaft 40. However, if preferred, these two elements can be fabricated from a single piece of material. The drive shaft 40 is hollow, and a pinion shaft 46 is mounted therewithin in concentric relationship. This pinion shaft 46 normally rotates as a unit with the drive shaft 40, and only undergoes angular displacement with respect thereto when the ratio of the two eccentrics 36—38 of FIG. 2 is being controllably varied. Pinion shaft 46 is mounted on a split bearing 48.

Carried on the inner eccentric 38 by means of a pin 50 is an idler gear 52. The latter has teeth 54 which mesh with teeth 56 of a further pinion gear 58 secured to the pinion shaft 46. The wall of drive shaft 40 is cut away at 60 over a portion of its circumference and for a portion of its length to allow for the engagement of these two gears 52—58, as shown in FIG. 3.

Attached to or formed integral with the outer eccentric 36 is an internal ring gear 61. The latter has teeth 62 which mesh with the teeth 54 of the idler gear 52. Accordingly, rotation of the pinion shaft 46 with respect to the drive shaft 40 will cause the latter to rotate the idler gear 52 in the direction (for example) as shown by the arrows in FIG. 3, since the inner eccentric 38 is fixedly attached to the drive shaft. Rotation of idler gear 52 will in turn rotate the outer eccentric 36 through the ring gear 61 so as to cause angular movement between the eccentrics 36 and 38 to thereby vary the over-all degree of eccentricity of the assembly with respect to the axis 64 of the drive shaft 40 and thus the "throw" of the connecting rod 34 of FIG. 2.

Figure 5:
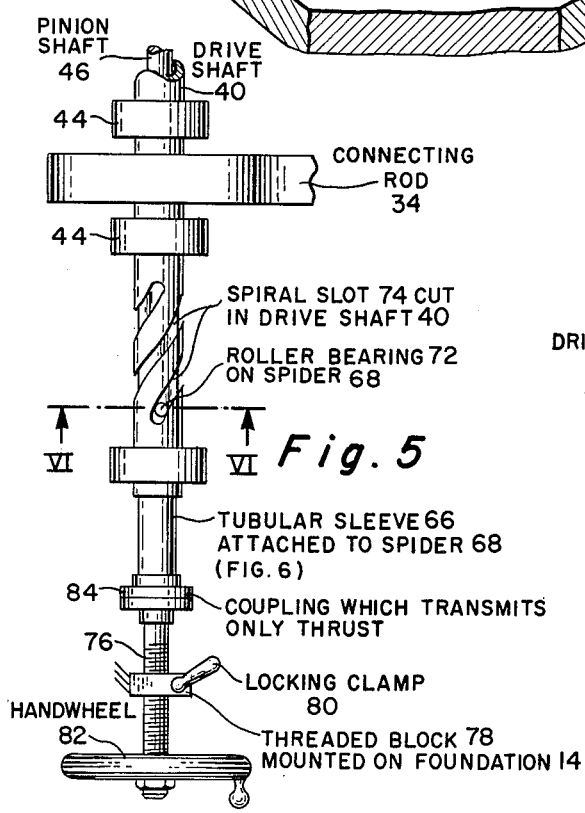
FIG. 5 is a plan view of one mechanism by means of which the eccentric of FIG. 3 may be manually adjusted to vary its "throw"
Figure 6:
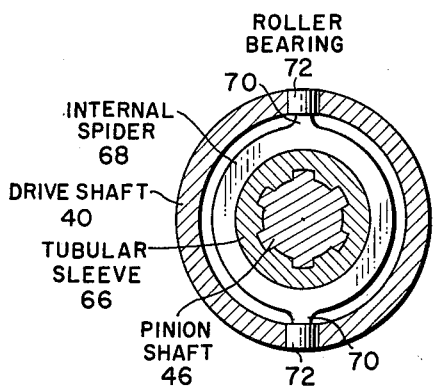
FIG. 6 is a sectional view of FIG. 5 taken along the line VI—VI.

One preferred manner of causing a relative angular displacement between the drive shaft 40 and the pinion shaft 46 (while both shafts are rotating) is illustrated in FIGS. 5 and 6. A tubular sleeve 66 is utilized which is coaxial with both the drive shaft 40 and the pinion shaft 46 and which lies therebetween as best shown in FIG. 6. This tubular sleeve 66 extends beyond the outer end of the drive shaft, as indicated in FIG. 5, and is splined to the pinion shaft 46 so that although it may move axially along the latter it nevertheless rotates as a unit therewith. It is also adapted for longitudinal as well as rotational movement with respect to the drive shaft 40, as will now be described.

The tubular sleeve 66 carries on its outer surface a spider 68 having two oppositely-disposed radially-projecting arms 70. The extremity of each such arm carries a roller bearing 72 (FIG. 6). The latter are respectively adapted to ride in a pair of symmetrical spiral slots 74 cut in the wall of the drive shaft 40, these slots 74 being so located that corresponding points of each are essentially in the same plane and spaced 180° apart around the circumference of the drive shaft.

Since the tubular sleeve 66 on which the spider 68 is carried is splined to the pinion shaft 46, a longitudinal (axial) movement therebetween causes the bearings 72 to ride in the spiral grooves or slots 74 to thereby cause an angular displacement between the sleeve 66 and the drive shaft 40. However, since the sleeve is splined to the pinion shaft 46, a corresponding angular displacement will occur between the pinion shaft and the drive shaft 40. This is the condition required to rotate the idler gear 52 of FIG. 3 and thus the outer eccentric 36, thereby producing a change in the over-all eccentricity of the assembly 34, 36, 38 of FIG. 2.

Mechanism for developing a longitudinal movement of the tubular shaft 66 in the manner above described includes a threaded shaft 76 which passes through a threaded block 78 having a manually-operated locking clamp 80 incorporated therein. On one end of shaft 76 is a handwheel 82 designed for manual actuation. On the other end of shaft 76 is a coupling element 84 which is also connected to the end of the tubular sleeve 66, as shown in FIG. 5. This coupling 84 carries the sleeve 66 in free-running fashion such that the former does not itself rotate. Consequently, the coupling transmits no torque between shaft 76 and the sleeve 66, but only axial thrust forces in the direction of the arrows.

It will now be seen that when the operator manipulates the handwheel 82, the pinion shaft 46 undergoes rotation relative to the drive shaft 40, thereby causing the outer eccentric 36 to roll around the inner eccentric 38 and thereby vary the amplitude of the lateral motion of rod 28 (FIG. 2). This, in turn, changes the vibration amplitude of table 10 in the manner previously brought out. It should be emphasized that it is not necessary to interrupt the operation of the vibrator to effect such a change, as the handwheel 82 may be manipulated at any time while the apparatus is in motion. This is very desirable when a continuous test run of long duration is being carried out.

Although not essential, some conventional form of braking mechanism (not shown) may be employed to prevent any residual rotation between the inner and outer eccentrics. Such a standard unit may include one or more brake shoes and drums, the former being preferably spring-loaded in "on," or braking position, and being shifted electromagnetically to "off" position when it is desired to change the eccentricity ratio by movement of handwheel 82. Although the degree of such eccentricity in the embodiments of FIGS. 3 through 6 can be taken as being a direct function of the longitudinal position of the sleeve 66, manufacturing tolerances between the gears, for example, may add up to cause a minor amount of "free play" unless a suitable braking unit of the above type is employed.

Figure 7:
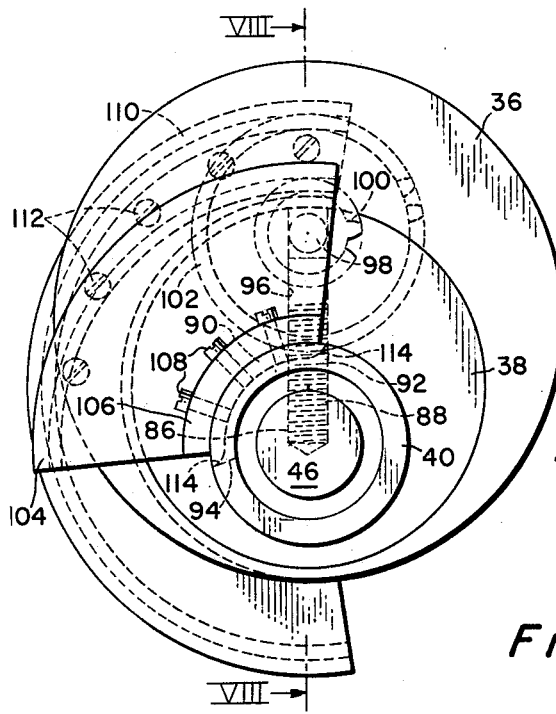
FIG. 7 illustrates a modification of the eccentric of FIGS. 3 and 4.
Figure 8:
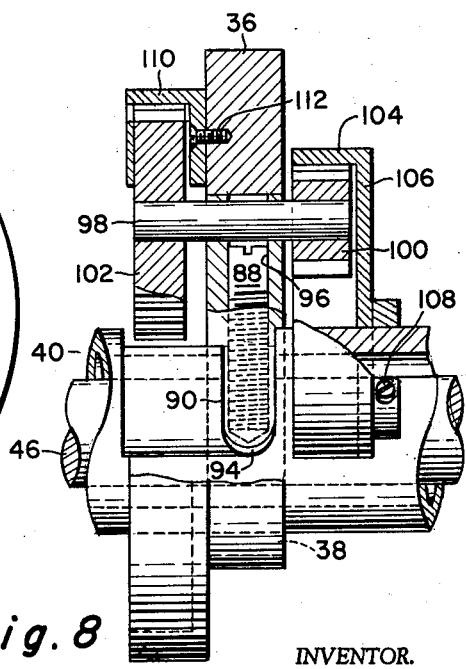
FIG. 8 is a partially sectional view of FIG. 7 taken along the line VIII—VIII.

FIGS. 7 and 8 illustrate a modified form of eccentric which may be utilized in place of the unit shown in FIGS. 3 and 4. In this modification of FIG. 7 and 8, a threaded radial opening 86 (FIG. 7) is formed in the pinion shaft 46 to receive a threaded pin 88, and a slot 90 is circumferentially formed in the wall of the hollow drive shaft 40 to allow the pin 88 to move between the shoulders 92 and 94 when the pinion shaft 46 is rotated with respect to the drive shaft 40 by some means such as shown in FIGS. 5 and 6. The pin 88 extends into an opening 96 formed in the inner eccentric 38, so that, when pinion shaft 46 rotates with respect to the drive shaft 40, the eccentric 38 also undergoes a similar angular movement with respect thereto between the limits defined by the stops 92 and 94.

The inner eccentric 38 also carries a transverse pin or bearing 98 which passes through the opening 96 and lies normal to the axis thereof as best shown in FIG. 8. From this latter figure it will also be seen that the axis of the pin 98 is parallel to that of the drive shaft 40.

Carried by the pin 98 on opposite sides of the eccentrics 36 and 38 are two pinion gears 100 and 102, these gears being secured to the pin 98 so that they rotate as a unit with respect to the inner eccentric 38 on which they are supported. The pinion gear 100 meshes with an internally-toothed ring gear 104 which is carried on a bracket 106 (FIG. 8) secured to the outer surface of the drive shaft 40 by means of the bolts 108. As best shown in FIG. 7, the ring gear 104 covers an arc of approximately 90°, or, in other words, it is commensurate with the distance traveled by the axis of pin 88 (and hence the axis of the pinion gear 100) between the limits defined by the shoulders 92 and 94 when the shaft 46 is rotated relative to the shaft 40. This action in turn causes the pinion gear 100 to rotate, since the teeth of the latter mesh with those of the ring gear 104 and the latter moves as a unit with the drive shaft 40. When the pinion gear 100 thus rotates, it results in a similar rotation of the pinion gear 102 which is also carried on the pin 98.

The pinion gear 102 is larger in diameter than the pinion gear 100, the ratio of their diameters being two to one, for example. The former meshes with an internally-toothed ring gear 110 carried on the outer eccentric 36 and securely attached thereto by means of the bolts 112. Consequently, when the gear 102 rotates, it causes the outer eccentric 36 to move around the inner eccentric 38 to thereby vary the over-all eccentricity of the assembly in a manner similar to that produced by the structure of FIGS. 3 and 4.

The shoulders 92 and 94 are each flared outwardly at 114, as best shown in FIG. 7, to prevent the teeth of pinion gear 102 from contacting the drive shaft 40 when the pin 88 is in abutting relationship with one of the shoulders.

Although the ring gear 104 is limited in extent to an arc of 90°, the ring gear 110 extends over an arc of 180°, due to the two-to-one ratio between the diameters of the pinion gears 100 and 102, and also due to the necessity of obtaining an angular displacement range of 180° between the eccentrics 36 and 38 where the total eccentricity of the unit is varied from zero to maximum.

It should be noted that the eccentric of FIGS. 7 and 8 is of the "constant phase" type. That is, its maximum eccentricity is fixed with respect to a particular angular position of the drive shaft 40. It is this feature that makes it particularly adaptable for use with variable-compression-ratio engines or other devices in which the "phase" of the eccentric must remain essentially unchanged during operation.

Obviously many modifications and variations of the present invention are possible in the light of the above teachings. It is therefore to be understood that within the scope of the appended claims the invention may be practiced otherwise than as specifically described.

I claim:

1. A power transmitting assembly including a hollow drive shaft, a first eccentric secured to said drive shaft so as to rotate therewith, a second eccentric mounted on the periphery of said first eccentric, said first and second eccentrics being normally fixed in position relative to one another, a connecting rod having a portion encircling said second eccentric, a control shaft enclosed within said hollow drive shaft and normally rotating in synchronism therewith, means responsive to a rotation of said control shaft with respect to said drive shaft to cause an angular displacement of said second eccentric with respect to said first eccentric and hence a variation in the "throw" of said connecting rod, said means responsive to a rotation of said control shaft including a pinion gear carried by said control shaft, a ring gear carried by said second eccentric, and an idler gear pivotally carried by said first eccentric, said idler gear meshing with both said ring gear and said pinion gear and being rotated about its pivot upon a rotation of said control shaft with respect to said drive shaft, means for causing a rotation of said control shaft with respect to said drive shaft, said last-mentioned means including a tubular sleeve positioned between said two shafts, said tubular sleeve being splined to said control shaft over at least a portion of its length for limited axial movement with respect thereto, a spider carried by said sleeve, said spider having a plurality of radially-extending arms, said drive shaft having a plurality of spiral slots adapted to respectively receive the arms of said spider, and means for producing an axial movement of said sleeve with respect to said drive shaft, whereby the arms of said spider will travel along said spiral slots to rotate the tubular sleeve and hence the control shaft to which said sleeve is splined, such rotation of said sleeve being with respect to said drive shaft and resulting in an angular displacement between said drive shaft and said control shaft.

2. In a power transmitting assembly including a hollow drive shaft, a control shaft enclosed within said hollow drive shaft, a first eccentric carried on said drive shaft for normal rotation therewith but capable of angular displacement with respect thereto, a first ring gear securely attached to said drive shaft, a second eccentric mounted on the periphery of said first eccentric for normal rotation therewith but capable of angular displacement with respect thereto, a second ring gear secured to said second eccentric, a pair of pinion gears pivotally carried by said first eccentric, one of said pinion gears meshing with said first ring gear and the other of said pinion gears meshing with said second ring gear, and means secured to said control shaft for causing an angular displacement of said first eccentric with respect to said drive shaft upon rotation of said control shaft with respect to said drive shaft.

3. An assembly according to claim 2, in which the ratio of the diameter of the pinion gear that meshes with said second ring gear to the diameter of the pinion gear that meshes with said first ring gear is 2:1.

4. An assembly according to claim 2, in which said first eccentric is formed with an opening extending radially thereinto, and in which said means for causing an angular displacement of said first eccentric with respect to said drive shaft includes a radial pin carried by said control shaft and extending into the opening in said first eccentric.

5. An assembly according to claim 2, in which the pivotal axis of each of said pair of pinion gears is parallel to the common longitudinal axis of both said control shaft and said drive shaft.

6. The method of preventing undesired vibration of a power-transmitting assembly which includes a power shaft, a first eccentric mounted on said shaft for unitary rotation therewith, a second eccentric mounted on the periphery of said first eccentric for normal rotation therewith but capable of angular displacement with respect thereto, a connecting rod having a portion encircling said second eccentric, and means selectively actuatable during rotation of said power shaft for producing an angular displacement between said first and second eccentrics to thereby vary the "throw" of said connecting rod without causing an interruption in the continuous transmission of power by said assembly, said method comprising the steps of balancing as a unit said second eccentric and the connecting rod portion associated therewith to bring the center of gravity of such unit into coincidence with the geometric center of the said first eccentric, and then balancing the said first eccentric to bring the center of gravity of both eccentrics and the said connecting rod portion into coincidence with the axis of rotation of the said power shaft.

References Cited in the file of this patent

UNITED STATES PATENTS

| | | |
|---|---|---|
| 363,629 | Grant | May 24, 1887 |
| 698,103 | Christenson | Apr. 22, 1902 |
| 739,773 | Arnold | Sept. 22, 1903 |
| 1,531,529 | Tonn | Mar. 31, 1925 |
| 1,875,838 | Winckler | Sept. 6, 1932 |
| 1,875,854 | Cooper | Sept. 6, 1932 |
| 2,108,062 | Hall | Feb. 15, 1938 |
| 2,209,417 | Obermoser | July 30, 1940 |
| 2,494,413 | Slettengren | Jan. 10, 1950 |
| 2,592,237 | Bradley | Apr. 8, 1952 |

FOREIGN PATENTS

| | | |
|---|---|---|
| 128,277 | Switzerland | Nov. 1, 1928 |